United States Patent [19]

Williams

[11] Patent Number: 4,813,624
[45] Date of Patent: Mar. 21, 1989

[54] OVERHEAD RELEASABLE ELEVATING SPINDLE DRIVE FOR A ROTARY FOOD PROCESSING TOOL

[75] Inventor: James E. Williams, Stamford, Conn.

[73] Assignee: Cuisinarts, Inc., Greenwich, Conn.

[21] Appl. No.: 86,058

[22] Filed: Aug. 14, 1987

[51] Int. Cl.[4] .................. B02C 18/10; B02C 18/24
[52] U.S. Cl. ............................. 241/252.2; 366/279
[58] Field of Search ................ 241/92, 101.2, 282.1, 241/36, 282.2; 366/279, 245, 330, 251, 349

[56] References Cited

U.S. PATENT DOCUMENTS

| | | | |
|---|---|---|---|
| 3,970,258 | 7/1976 | Mantelet | 241/282.1 |
| 4,487,509 | 12/1984 | Boyce | 366/279 X |
| 4,723,719 | 2/1988 | Williams | 366/330 X |

*Primary Examiner*—Mark Rosenbaum
*Attorney, Agent, or Firm*—Parmelee, Bollinger & Bramblett

[57] ABSTRACT

A rotary food processing tool has an elongated upright hub rotatable about a vertical axis with sockets in its upper and lower ends. Each socket has inclined grooves, and the elongated hub is adapted to be driven from a motor drive unit mounted on top of the bowl having a drive shaft extending downwardly. The elongated hub carries blades extending outwardly from the axis for processing food near the bottom of the bowl. A spindle having a plurality of protrusions for mating with the inclined grooves in the upper hub socket is mounted for rotation on the drive shaft. A vertical stationary guide post extends upwardly from the bottom of the bowl. Upon actuation of the motor drive, the elongated hub is lifted upwardly by the screw action of the drive spindle in the upper socket of the hub, while the lower socket remains encircling the guide post for aligning and stabilizing rotation of the elevated hub. This elevation of the elongated hub during driving lifts the hub slightly away from the bottom of the bowl and causes the lower socket to be lifted up on the guide post for precisely aligning and stabilizing the elongated hub about its vertical axis. The rotary tool is invertible and can be driven from either end for increasing the number and type of food processing operations.

18 Claims, 3 Drawing Sheets

4,813,624

OVERHEAD RELEASABLE ELEVATING SPINDLE DRIVE FOR A ROTARY FOOD PROCESSING TOOL

BACKGROUND

This invention relates to a compact food processing appliance containing an invertible/reversible rotary food processing tool and more particularly, to such an applicance having an overhead releasable elevating spindle drive eliminating the need for mounting the rotary tool on active bearing means which at high speeds can overheat.

This invention relates to an improvement in apparatus disclosed and claimed in application Ser. No. 945,490 filed Dec. 23, 1986, now U.S. Pat. No. 4,723,719, and entitled "INVERTABLE/REVERSIBLE TOOL FOR USE IN A ROTARY FOOD PROCESSING APPLIANCE" by the present inventor. That application has a rotary food processing tool with blades extending outwardly therefrom which performed certain types of food processing operations in a first position and other types of food processing operations in an upside-down position.

The appliance in said prior patent application includes motor-driven drive means extending into the bowl for rotating the tool about a vertical axis in the bowl. The processing tool advantageously has an elongated upright hub adapted to be rotated about a vertical axis by the drive means for performing predetermined food processing operations in a first position and other predetermined food processing operations when the tool is inverted for rotation in a second upside-down position. The elongated upright hub has first and second coupling means on opposite ends thereof each of which is adapted to engage the drive means in driven relationship for rotating the upright hub about the vertical axis in a first direction when the first coupling means is engaged and in a second direction when the second coupling means is engaged with the drive means.

In that appliance the invertible/reversible tool is mounted in the bowl on an upstanding rotatable guide shaft mounted on the bottom of the bowl for rotation about a vertical axis by means of a sealed bearing unit which is anchored to the bottom of the bowl. Accordingly, this rotatable guide shaft rotates with the rotary tool whenever the tool is being rotated by the drive means. Thus, the sealed bearing unit is driven at relatively high speeds, and because of its compact size has a tendency to overheat. This compact sealed bearing unit cannot be operated continuously for long periods of time because of the tendency to overheat. Although this limit on continuous operation is not a problem when the appliance is used properly, it would be desirable to eliminate this sealed bearing unit to insure longer, more reliable performance by the appliance and to eliminate the costs associated with such a sealed bearing unit.

SUMMARY OF THE DISCLOSURE

Accordingly, it is an object of this invention to provide an improved food processing appliance of the type having an invertible/reversible tool for performing different food processing operations depending upon which end of the elongated hub is facing upwardly and wherein the need is eliminated for a sealed bearing unit anchored to the bottom of the bowl.

A further object of this invention is to provide an improved overhead releasable elevating spindle drive for an invertible/reversible food processing tool which is more reliable, less expensive and has greater longevity than the previously used drive employing sealed bearings anchored to the bottom of the bowl.

In carrying out this invention in one illustrative embodiment thereof, an electrical food processing appliance includes a rotary food processing tool adapted to be rotated in the bowl of the appliance and has a motor drive united mounted on top of the bowl for rotating the tool in the bowl. The rotary tool has an elongated upright hub with a first and second end, with the hub being rotatably driven about a vertical axis in the bowl. At least one end of the elongated hub has a socket therein including a plurality of inclined grooves which have an angle of pitch relative to a line parallel with said axis. The second end of the elongated upright hub has an axially extending recess adapted to receive a vertical stationary guide post mounted in the bottom of the bowl having an upper end extending upwardly into the recess for acting as a stabilizing guide and insuring vertical alignment of the elongated upright hub in the bowl when the hub is rotated. The elongated hub has blades extending therefrom which are adapted to process food near the bottom of the bowl when the rotary processing tool is operatively positioned in the bowl. A motor drive shaft extends downwardly from the motor drive unit and has a predetermined direction of rotation when the motor unit is actuated. A spindle is mounted for rotation on the motor drive shaft and has a plurality of protrusions for mating with the inclined grooves in the socket with the spindle on the motor drive shaft extending downwardly into the socket when the motor drive is operatively positioned on the top of the bowl. The spindle engages the socket and thereby rotates the elongated upright hub when the motor drive is actuated for lifting the elongated hub upwardly by screw action off of the bottom of the bowl during rotation.

The second end may also have a socket which mates with the spindle permitting the rotary food processing tool to be inverted and driven by the motor drive shaft and spindle mounted thereon. By using different edges of the rotating blades when the upright hub is turned upside-down predetermined food processing operations are performed by the same tool in a first position using the first edges of the blades on the tool while different food processing operations can be performed by turning the tool upside-down and using the second edges of the blades for performing different food processing operations.

By employing the complementary spindle and mating sockets for elevating the tool during operation, there is no need for the invertible-reversible rotary food processing tool to be operated with a rotatable bearing unit anchored in the bottom of the bowl.

The guide post is stationary, fixed to the bottom of the bowl and is inexpensive. This stationary guide post has an enlarged knob on its upper end. In one embodiment, there is a wear-resistant ring in the axially extending recess. The elevation of the elongated hub during driving lifts the hub slightly away from the bottom of the bowl and causes the wear-resistant ring to be lifted up for encircling the equatorial region of the knob on the stationary guide post for precisely aligning and stabilizing the elongated hub about its vertical axis during rotation. In another embodiment, a collar on the lower extremeties of the recess encircles the post below the knob to help align, stabilize and retain the tool on the post.

BRIEF DESCRIPTION OF THE DRAWINGS

The invention, together with further objects, aspects, features and advantages thereof, may be more fully understood from the following description considered in conjunction with the accompanying drawings in which the same reference numerals are used on the similar elements throughout the various views.

DESCRIPTION OF THE PREFERRED EMBODIMENTS

Figure 1:
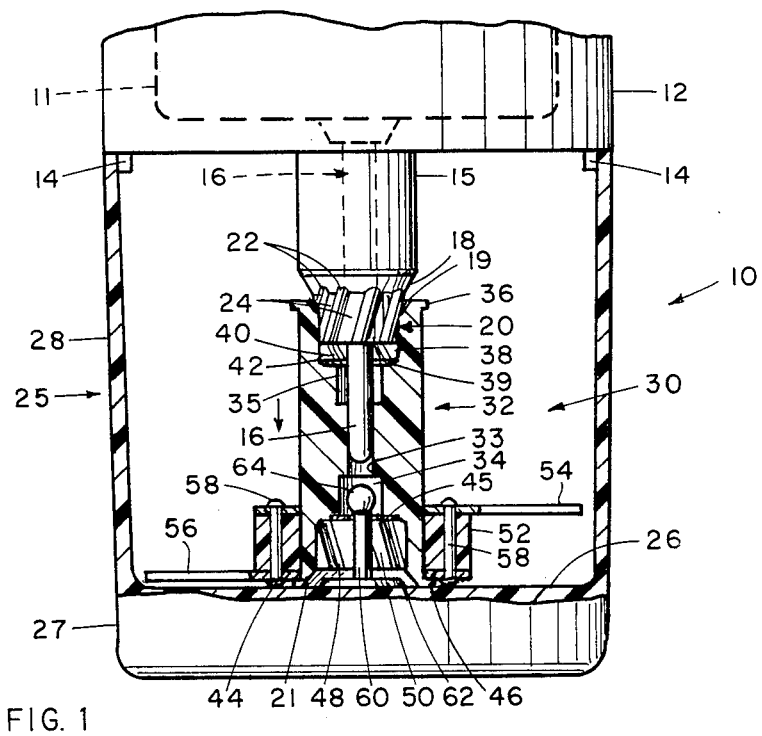
FIG. 1 is a side elevational sectional view of the bowl and tool structures of a food processing appliance having a top housing containing a motor drive with downwardly extending drive means including a drive spindle having a fluted configuration with lands and grooves arranged in a helical pattern. The top housing is mounted on top of the bowl, but the motor drive is not being operated. Thus, the invertible/reversible rotary tool is resting on the bottom of the bowl.

Referring now to FIG. 1, a compact food processing appliance, referred to generally by the reference numeral 10, includes a top housing 12 containing an electric motor drive 11 having a downwardly extending shoulder 14 recessed inwardly from the periphery of the cylindrical top housing 12 for fitting inside of the rim of a bowl to be described. A drive shaft 16 extending downwardly from the motor drive 11 within a stationary boss 15 carries a fluted spindle 20 having an upwardly and outwardly flaring tapered shoulder 18 at the top thereof. There are a plurality of lands 22 and grooves 24 on the spindle 20 oriented in a helical pattern with an angle of pitch which extends upwardly and rearwardly on the spindle with respect to the predetermined direction of rotation 23 (FIG. 2) of this spindle when being rotated by the motor drive 11 in the housing 12. This fluted spindle 20 and the drive shaft 16 are rotated at relatively high speed by the motor drive 11 in the housing 12, for example, at a rotational speed in the range from about 800 revolutions per minute (RPM) to about 6,000 RPM or higher.

A work bowl 25 having a bottom 26 and cylindrical side walls 28 is provided for holding food items to be processed by the appliance 10. An invertible/reversible food processing tool, referred to generally by the reference numeral 30, is adapted to be mounted in the bowl 25 to be rotated in the bowl by the fluted spindle 20 in a manner to be explained later.

The bowl 25 is terminated in an annular downwardly extending skirt 27 which supports the bowl 25 on a kitchen counter or table or other work surface in operating position. An electrical cord (not shown) has an electrical plug on its end to be inserted into a conventional AC electrical outlet for 115 volts, 50 Hz to 60 Hz, to energize the motor drive 11 within the housing 12 when this housing is appropriately mounted on the rim of the bowl 25 with the downwardly extending shoulder 14 resting on the inner periphery of the rim of the bowl 25. A stationary upstanding guide post 60 is securely mounted on a pedestal 62 centrally positioned on the bottom 26 of the bowl 25 and carries on its upper end a spherical knob 64 whose purpose will be explained later.

The invertible/reversible rotary food processing tool 30 has an elongated upright hub 32 with an axial bore 33. This elongated hub 32 includes upper and lower annular collars 36 and 46, respectively, on its opposite ends. The elongated upright hub 32 is intended to be coupled in driven relationship with the fluted spindle 20 by first coupling means in the form of an upper fluted socket 38 terminated at its lower end in a wear-resistant ring 39 and having a plurality of lands and grooves 40 and 42 oriented in a helical pattern with an angle of pitch of the helical pattern of the lands 40 and grooves 42 in the socket 38 corresponding to the angle of pitch of the lands and grooves on the spindle 20, thus, the lands and grooves 40, 42 are adapted to mate with the spindle and are sloping downwardly and forwardly with respect to the rotation of the fluted spindle 20 as indicated by the arrow 23 in FIG. 2.

The upright hub 32 is also adapted to be driven by second coupling means in the form of a lower fluted socket 44 terminated in a wear-resistant ring 45, this socket 44 being located on the other end of the elongated upright hub 32 from the socket 38. The lower fluted socket 44 has a plurality of lands 48 and grooves 50 therein which have the same helical pattern as the lands and grooves 40 and 42, respectively, of the upper fluted socket 38 with the same helical orientation such that when the elongated hub is inverted and turned upside-down the helical pattern of the lower fluted socket 44 will then become the upper fluted socket and will be the same as the upper fluted socket 38 orientation illustrated in FIGS. 1 and 2. Accordingly, upper fluted socket 38 and the lower fluted socket 44 have identical configurations in the form of fluted land and groove sockets with shapes that are adapted to mate and freely, slidably mesh with the lands and grooves 22 and 24 on the fluted spindle 20. The fluted spindle 20 freely removably fits into either the fluted socket 38 or the fluted socket 44 with a freely sliding meshing relationship for thereby rotating and elevating the elongated upright hub 30.

Figure 2:
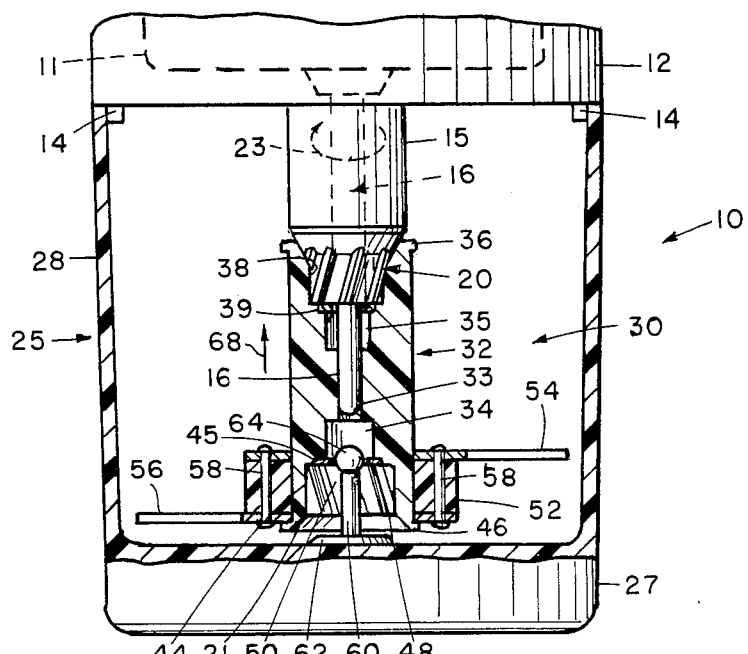
FIG. 2 is a view similar to FIG. 1, except that the tool is now being rotated at relatively high speed by the downwardly extending helical spindle of the motor drive so that the rotary tool is advantageously being elevated from the bottom of the bowl by screw action of the drive spindle.

An encircling annular blade hub 52 is slidably mounted on the elongated upright hub 32 for axial movement along the hub and is keyed to the elongated upright hub 32 by any suitable means, for example, that shown in the aforesaid co-pending application Ser. No. 945,490. A pair of invertible/reversible blades 54 and 56 are rigidly mounted by rivets 58 onto the top and bottom of the annular blade hub 52 as illustrated in FIGS. 1 and 2. The blades 54 and 56 may have different trailing and leading edges as described in the aforesaid co-pending application so that different food processing operations can be performed when the inverted position of the blades are utilized in the operation of the appliance 10. The aforesaid co-pending patent application is incorporated herein by reference for more information.

In operation, FIG. 1 illustrates the top housing 12 positioned on the work bowl 25 with the motor drive shaft 16 extending downwardly into the central channel bore 34 of the elongated upright hub 32 and the fluted spindle 20 extending into the upper end of the upper fluted socket 38. In this non-driven position as shown in FIG. 1, the encircling blade hub 52 is positioned on the lower end of the elongated upright hub 32 resting on the lower annular collar 46 near the bottom 26 of the bowl 25. When the motor drive unit 11 in the top housing 12 is actuated to be energized, the fluted spindle 36 rotates with the drive shaft 16 in the direction of the arrow 23 as shown in FIG. 2, which in effect screws the upper fluted socket 38 upwardly farther onto the fluted spindle 20 until the upper fluted socket comes into contact with and is restrained by the tapered shoulder 18 on the spindle 20.

The entire rotary tool 30 is lifted or elevated upwardly in the direction of the arrow 68 off from the bottom 26 of the bowl 25 to process food which is positioned in the bowl. It is to be noted in FIG. 2 that the wear-ring 45 at the top of the lower fluted socket 44 in the elevated operating position of the tool 30 as shown in FIG. 2 has been lifted by the rotation of the elongated upright hub to a position where the wear-ring 45 encircles the equator of the spherical knob 64 thereby stabilizing the rotation of the elongated hub in the bowl and acting as a bearing surface to stabilize and align the rotation of the elongated upright hub 32 about its vertical axis of rotation. The advantageous cooperation of the elevated wear-ring 45 encircling the equatorial region of the stationary spherical knob 64 on a stationary post 60 replaces the rotatable shaft and sealed bearing unit of the aforesaid application thereby replacing an expensive, vulnerable rotatable bearing unit.

As was explained the fluted spindle 20 with its lands 22 and grooves 24 oriented in a helical pattern which is the same as the helical pattern of the lands and grooves in both the upper and lower fluted sockets 38 and 44 enable the patterns to mate and provide the elevation action just described. The angle of the pitch of the helical pattern of the lands and grooves of the fluted spindle 20 and the lands and grooves of the sockets 38 and 44 provides a slope downwardly and forwardly with respect to the predetermined direction of rotation 23 which in effect lifts the elongated upright hub 32 upwardly by screw action off from the bottom of the bowl during the rotation of the spindle 22. This angle of the pitch of the helical patterns on the spindle and in the socket is in the range of about 3° to about 40° with respect to a line parallel with the axis of rotation and preferably is in the range of about 4° to 10°. When the motor drive 11 stops, the elongated hub 32 drops by gravity back to the bottom of the bowl.

There is an axial recess 35 below the wear-resistant ring 39 and another axial recess 34 above the other wear-ring 45. These recesses provide clearance for the knob 64. The axial bore 33 interconnects these recesses 34 and 35, and the lower end of the shaft 16 fits into this axial bore regardless of which end of the elongated hub 32 is facing upward. The conically tapered concentric shoulder 18 on the rotating spindle 20 mates with a conically flaring concentric mouth opening 19 or 21 into the fluted socket 38 or 44, respectively, when the rotating tool 30 is lifted (68) during operation for centering the tool in alignment with the axis of rotation.

It will be apparent that since the patterns of the upper and lower sockets 38, 44 are the same, the reversible tool 30 may be inverted and driven in the same manner which was just described in connection with the upper fluted socket 38. When inverted the spindle 20 will fit into the fluted socket 44 and operate in the manner just described. Accordingly, a compact food processing appliance is improved by simplifying the guide and bearing structure thereby rendering the unit less expensive, more reliable and less subject to damage by inadvertent prolongation of operating procedures.

Figure 3:
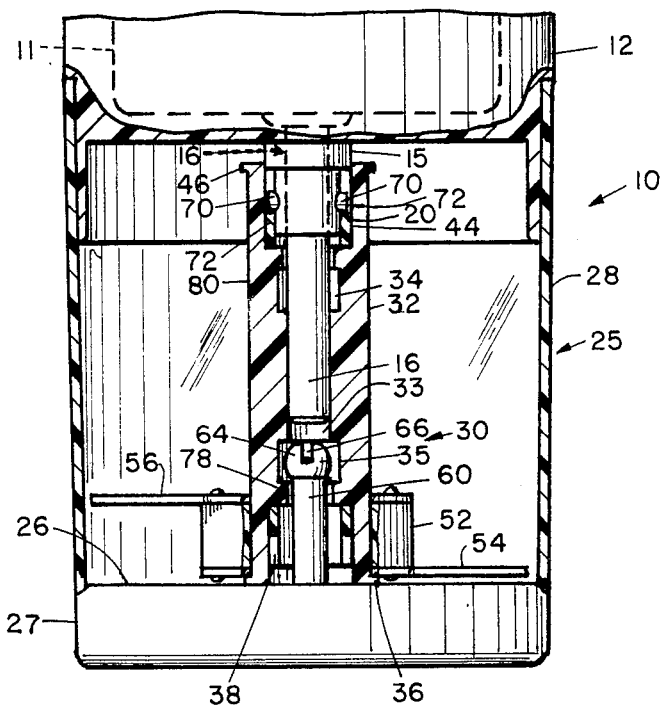
FIG. 3 is a side elevational partial sectional view of the bowl and tool structures similar to FIG. 1 illustrating another embodiment of the invention.
Figure 4:
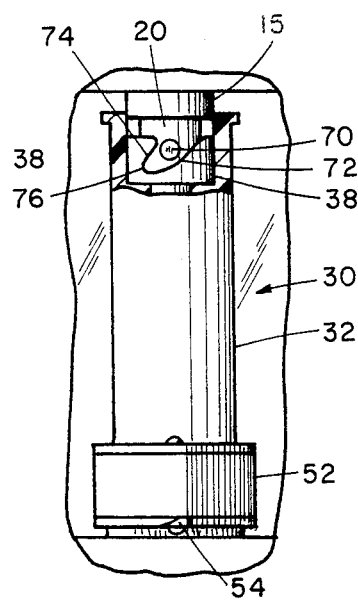
FIG. 4 is a partial view of FIG. 3 rotated 90° showing the food processing tool out of engagement with the socket in one end of the tool.

Referring now to another embodiment as illustrated in FIGS. 3–6, the same screw action is achieved by replacing the land and groove structure on the spindle and sockets with cooperating studs and inclined grooves, respectively. As shown in FIG. 3, the spindle 20 has diametrically positioned protrusions or studs 70 extending outwardly from the spindle 20 which is mounted on the drive shaft 16. The studs 70 are adapted to extend into cooperating complementary slots 72 in socket 38 having leading edges 74 and a rounded termination 76 conforming to the configuration and size of the outer perimeter of the studs 70 as is illustrated in FIG. 4. As will be seen in FIG. 4, the studs 70 are shown in non-operative engagement in the grooves 72. The approximate angle of the leading edge 74 of the groove 72 is 45° which is not critical. The rounded ends 76 of the grooves 72 will be slightly larger than the rounded perimeter of the studs 70 so that the studs may freely engage and slide down the leading edge 74 into the ends 76 and engage the grooves for driving the tool 30. Likewise, on the turning off of the motor drive, the studs 70 will be free to disengage from the grooves 72 and permit the socket 38 to return to its initial inoperative position as shown in FIG. 4.

In addition to the changes in this spindle and groove structure the upstanding guide post 60 is shown provided with a bifurcated sphere 64 having a slot 66. In addition, the recess 35 has a collar 78 on the lower end thereof which is spaced outwardly from the post 60. Likewise, the axial extending recess 34 has a collar 80 corresponding to the collar 78 which performs the same function for the recess 34. The hub 32 of the tool 30 is adapted to be mounted on the guide post 60 with the bifurcated spherical knob 64 snapping into the recess 35 through the collar 78. The collar 78 not only properly aligns and guides the elongated upright hub 32 of the tool 30 onto the guide post 60, but retains it thereon during the operation of the tool and also tends to act as a stabilizer and guide as well as insuring the vertical alignment of the elongated hub 32 in the bowl 25 when it is rotated therein by the spindle 20.

Figure 5:
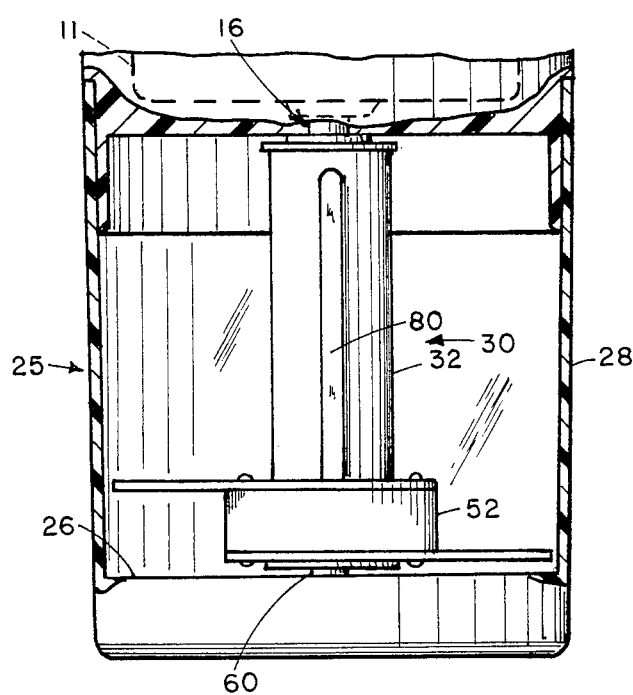
FIG. 5 is similar to FIG. 4 showing the food processing tool elevated from the bottom of the bowl and being driven therein.
Figure 6:
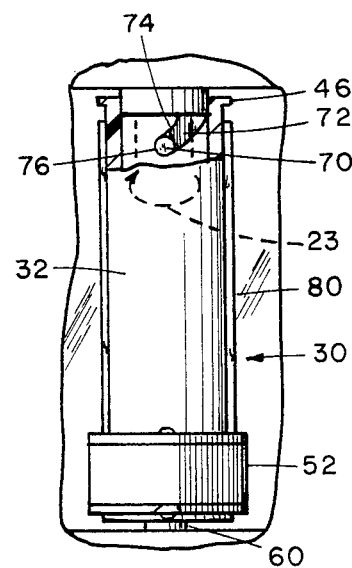
FIG. 6 is similar to FIG. 4 illustrating the studs of the spindle engaging the inclined grooves in the socket of the food processing tool for elevating and driving the tool as shown in FIG. 5.

FIGS. 5 and 6 illustrate what happens when the motor drive 11 is activated. As will be seen in FIG. 6, the rotation of the drive shaft 16 turning in the direction of the arrow 23 moves the studs 70 into contact with the leading edges 74 of the grooves 72 driving the studs 70 forwardly and downwardly into the grooves 72 until they engage the bottom 76 of the grooves 72 thereby rotating the tool 30 in the bowl 25. The combination of the studs on the spindle 20 and the inclined grooves 72 produces a screw action about the vertical axis of the drive shaft which elevates the tool off of the bottom of the bowl 25 as shown in FIG. 5. The inclined grooves form an interrupted or partial helical screw pattern similar to the interrupted helical pattern of the land and groove arrangement in FIGS. 1 and 2.

FIGS. 5 and 6 also illustrate the spline structure 80 cooperating with a keyway (not shown) which permits the axial movement of the encircling annular blade hub 52 in a manner described in the aforesaid copending application.

Figure 7:
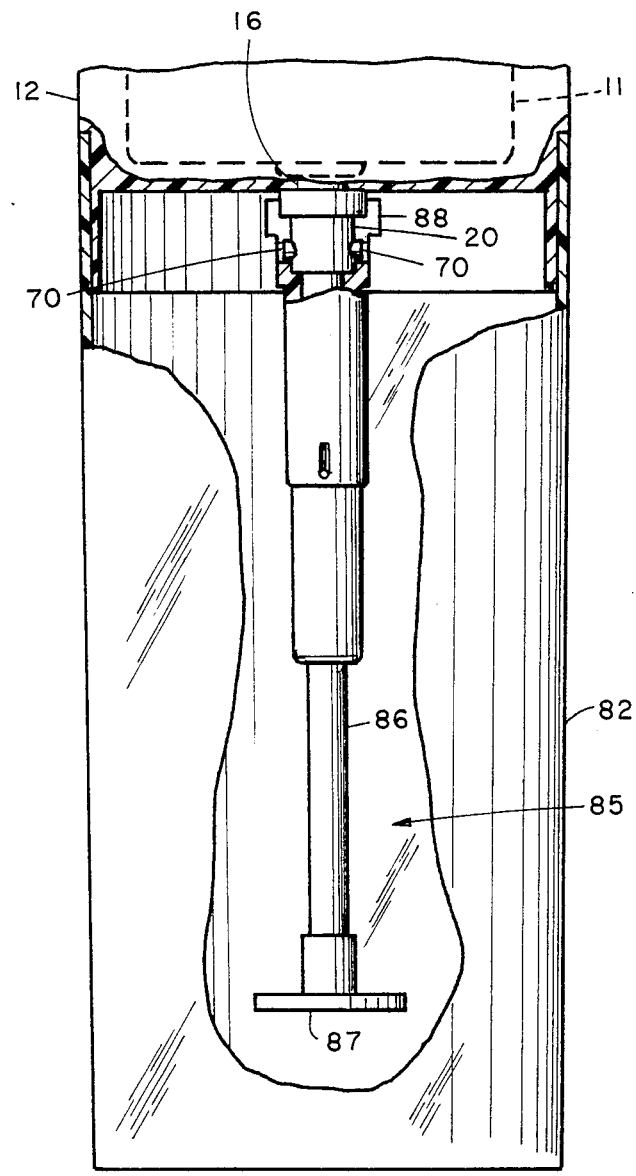
FIG. 7 illustrates another embodiment of the present invention comprising a mixing rotary tool mounted on the driving spindle used in the embodiment of FIGS. 3-6 together with a larger bowl.
Figure 8:
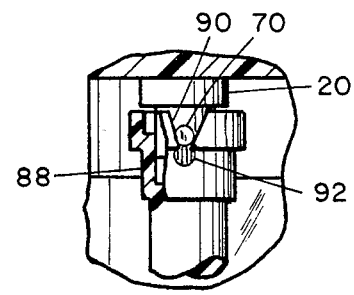
FIG. 8 is a partial view of FIG. 7 illustrating the socket of the mixing tool being aligned with the studs of the spindle for driving the tool in the bowl.
Figure 9:
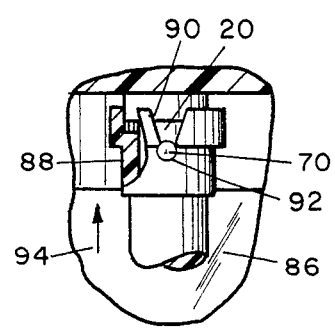
FIG. 9 is similar to FIG. 8 illustrating the socket of the mixing tool in frictional engagement with the studs of the spindle whereby the spindle rotates the mixing tool in the bowl.

Aside from the simplified structure of the embodiment shown in FIGS. 3–6, the use of a spindle having diametrically opposed studs 70 extending therefrom permits the flexibility of utilizing the same overhead motor drive to extend the use of the appliance by adding an additional feature thereto. Such an embodiment is shown in FIGS. 7–9 in which a larger bowl 82 replaces the bowl 25 with the bowl 82 having the same diameter as bowl 25 but being longer and therefore larger. The purpose of the bowl 82 is to provide a mixing function in combination with a rotary food processing tool 85 which is simply mounted on the studs 70 of the spindle 20. The mixing tool 85 has an elongated shaft 86 with a suitable mixing disc 87 mounted on one end thereof and a socket 88 mounted on the other end thereof. The socket 88 as will best be seen in FIGS. 8 and 9 has diametrically positioned V-shaped entry slots 90 therein terminated in open spherical grooves 92 which are adapted to receive and frictionally engage the studs 70 of the spindle 20. In installing the mixing tool 85, the V-shaped slots 90 of the socket 88 are aligned with the diametrically opposed studs 70 on the spindle 20 and the tool is pushed upward in the direction of the arrow 94 to snap the studs 70 into engagement with the spherical grooves 92 locking them in position so that the mixing tool 85 may be rotated by activating the drive means 11 of the processor. The bowl 82 is of course longer than the mixing tool and adapted to receive the items which are to be mixed therein. The mixing disc 87 may be tilted slightly from the vertical axis of its shaft 86 and have corrugations thereon for enhancing and performing the mixing function.

A simplified screw action drive performs the same function as the embodiments of FIGS. 1 and 2 in the same functional manner elevating the tool from the bottom of the bowl once it has been activated and releasing the tool when the drive means is inactivated, returning the tool to its initial position. The simplified drive structure using the studs also adapts itself to providing versatility to the appliance by permitting a mixing disc tool 85 to be snapped onto the drive and used with a larger bowl to provide a mixing function.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In an electrical food processing appliance having a bowl, a rotary food processing tool adapted to be rotated in said bowl and a motor drive unit mounted on the top of said bowl for rotating said rotary food processing tool in said bowl, the improvement comprising:
   a rotary food processing tool having an elongated upright hub with a first and a second end,
   said hub being adapted to be rotatably driven about a vertical axis in said bowl,
   at least said first end of said elongated upright hub having a socket therein including a plurality of inclined grooves,
   said inclined grooves being oriented in an interrupted screw pattern having an angle of pitch relative to a line parallel with said axis,
   at least said second end of said elongated upright hub having an axially extending recess therein,
   said elongated upright hub having blades extending therefrom which are adapted to process food near the bottom of said bowl when said rotary food processing tool is operatively positioned in said bowl,
   a motor drive shaft extending downwardly from said motor drive unit and having a predetermined direction of rotation when said motor drive unit is actuated,
   a spindle mounted for rotation on said motor drive shaft,
   said spindle having a plurality of protrusions oriented in a pattern for mating with said inclined grooves in said socket,
   said spindle and said motor drive shaft extending downwardly into said socket when said motor drive is operatively positioned on the top of said bowl,
   said spindle engaging said socket and rotating said elongated upright hub when said motor drive is actuated,
   a vertical guide post mounted fixed to the bottom of said bowl having an upper end extending upwardly into the axially extending recess in said elongated upright hub for acting as a stabilizing guide and insuring the vertical alignment of said elongated upright hub in said bowl when rotated by said spindle,
   said angle of pitch of said inclined grooves of said socket sloping downwardly and forwardly with respect to said predetermined direction of rotation for lifting said elongated upright hub upwardly by screw action off of the bottom of said bowl during rotation of said spindle.

2. The improvement as claimed in claim 1 wherein said socket is a fluted socket having a plurality of lands between said inclined grooves, said lands and grooves of said fluted socket oriented in a helical pattern, said spindle being a fluted spindle having a plurality of lands between said grooves oriented in a helical pattern for mating with said lands and grooves in said fluted socket.

3. The improvement as claimed in claim 2, wherein said second end of said elongated upright hub has a fluted socket therein including a plurality of lands and grooves having the same helical pattern of lands and grooves as said fluted socket in said first end of said elongated upright hub and said first end has an axially extending recess therein adapted to fit onto said vertical guide post, whereby said elongated hub is reversible and may be driven by said fluted spindle from either said first end or said second end.

4. The improvement as claimed in claim 3, wherein: the recess in said first and second ends of said elongated upright hub are connected by an axial bore in said hub, and the lower end of said motor drive shaft extends down into said axial bore regardless of which end of said elongated hub is facing upwardly.

5. The improvement as claimed in claim 2, wherein said second end of said elongated upright hub has a second fluted socket therein including a plurality of lands and grooves having the same helical pattern of lands and grooves as said fluted socket in said first end of said elongated upright hub and said first end has a second axially extending recess therein adapted to receive said vertical guide post with a second wear-ring of wear resistant material associated with said second recess for encircling said enlarged knob when said tool is operated and lifted by said second fluted socket being engaged with and driven by said fluted spindle.

6. The improvement as claimed in claim 5 wherein, said fluted spindle has a conical shoulder at its upper end flaring upwardly and outwardly, and each of said fluted sockets has a tapered mouth flaring outwardly toward the entrance into the respective mouth for engaging against said tapered shoulder for limiting the lifting screw action of said fluted spindle on the socket engaged therewith and for centering the upper end of the elongated hub with respect to said axis during rotation by said spindle.

7. The improvement as claimed in claim 2, wherein said fluted spindle has a conical shoulder at its upper end flaring upwardly and outwardly, and said fluted socket has a tapered mouth flaring upwardly and outwardly for engaging against said tapered shoulder for limiting the lifting screw action of said fluted spindle and for coaxially centering the upper end of the elongated hub with respect to said axis during rotation by said spindle.

8. The improvement as claimed in claim 1, wherein said vertical guide post has an enlarged knob on said upper end thereof, said knob being concentric with respect to said vertical axis and said axially extending recess has associated therewith a wear-ring of wear resistant material, said elongated upright hub being lifted a predetermined distance during rotation for causing said wear-ring to encircle said enlarged knob during rotation for stabilizing and aligning said elongated hub with respect to said vertical axis.

9. The improvement as claimed in claim 3, wherein said angle of pitch of said helical pattern is in the range of about 3° to about 40°.

10. The improvement as claimed in claim 9, wherein said angle of pitch is optimally in a range of about 4° to about 10°.

11. The improvement as claimed in claim 8, wherein said enlarged knob is generally spherical having an equatorial region and said wear-ring when lifted by the rotation of said elongated upright hub encircles the equatorial region of said knob thereby acurately stabilizing the rotation of said elongated upright hub with respect to said vertical axis.

12. The improvement as claimed in claim 1 wherein said plurality of protrusions on said spindle comprises a pair of studs extending from opposite sides of said spindle, said inclined grooves being positioned on opposite sides of said socket for mating with said studs and lifting said rotary food processing tool as said stubs ride down said inclined grooves in said socket in said hub of said tool.

13. The improvement as claimed in claim 12, wherein: said inclined grooves comprise inclined slots having inclined leading edges sloping downwardly and forwardly with respect to said predetermined direction of rotation for lifting said tool as said studs slide down along said leading edges.

14. The improvement as claimed in claim 13, wherein: said inclined leading edges are inclined at an angle of about 45°.

15. The improvement as claimed in claim 1 wherein said vertical guide post has an enlarged knob on said upper end thereof, said knob extending up into said recess in said elongated hub when said rotary food processing tool is mounted in said bowl on said vertical guide post, said knob retaining said tool on said guide post during the rotation of said tool.

16. The improvement as claimed in claim 15 in which said knob is bifurcated.

17. In an electrical food processing appliance having a bowl with a bottom, a rotary food processing tool adapted to be rotated in said bowl and a motor drive mounted on the top of said bowl for rotating said rotary food processing tool in a predetermined direction of rotation in said bowl, the improvement comprising:
a motor drive shaft extending downwardly from said motor drive unit,
a spindle mounted on said motor drive shaft for rotation in said predetermined direction,
a fixed vertical guide post extending upwardly from the bottom of said bowl and being concentrically located in said bowl,
a pair of studs mounted on said spindle extending from diametrically opposed sides of said spindle,
a rotating food processing tool having an elongated hub with a first and a second end which is adapted to be rotatably driven about a vertical axis in said bowl,
a socket positioned in said first end of said elongated upright hub,
said second end of said elongated hub rotatably positioned on said guide post,
a pair of inclined slots positioned in opposite sides of said socket oriented to freely engage with said studs on said spindle when said socket on said upright elongated hub is mounted on said spindle with said studs on said spindle aligned with said slots in said socket, said pair of inclined slots each having an inclined leading edge sloping forwardly and downwardly relative to said predetermined direction of rotation for lifting said elongated hub as said studs slide down said inclined leading edges for elevating said food processing tool away from the bottom of said bowl as said second end of said elongated hub moves upwardly on said fixed guide post.

18. The improvement as claimed in claim 17 in which: said leading edges of said inclined slots are inclined at an angel of about 45°.

* * * * *